US011843884B1

United States Patent
Zou et al.

(10) Patent No.: US 11,843,884 B1
(45) Date of Patent: Dec. 12, 2023

(54) HV DRIVER FOR ROLLING CLAMP IN IMAGE SENSOR

(71) Applicant: OMNIVISION TECHNOLOGIES, INC., Santa Clara, CA (US)

(72) Inventors: Lei Zou, Oslo (NO); Sindre Mikkelsen, Ski (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 18/309,677

(22) Filed: Apr. 28, 2023

(51) Int. Cl.
*H04N 25/767* (2023.01)
*H04N 25/709* (2023.01)
*H04N 25/77* (2023.01)

(52) U.S. Cl.
CPC ......... *H04N 25/709* (2023.01); *H04N 25/767* (2023.01); *H04N 25/77* (2023.01)

(58) Field of Classification Search
CPC .... H04N 25/709; H04N 25/767; H04N 25/77; H04N 25/779
See application file for complete search history.

(56) References Cited

U.S. PATENT DOCUMENTS

| | | | |
|---|---|---|---|
| 2020/0007808 A1* | 1/2020 | Jung | H04N 25/625 |
| 2021/0176417 A1 | 6/2021 | Xu et al. | |
| 2022/0286628 A1* | 9/2022 | Kim | H04N 25/74 |

* cited by examiner

*Primary Examiner* — Kevin K Pyo
(74) *Attorney, Agent, or Firm* — Perkins Coie LLP

(57) ABSTRACT

An imaging system includes a pixel array with pixel circuits, each including a photodiode, a floating diffusion, a source follower transistor, and a row select transistor. The imaging system further includes rolling clamp (RC) drivers, each coupled to a gate terminal of a row select transistor of one of the pixel circuits and each including first and second PMOS transistors coupled between a clamp voltage and the gate terminal of the row select transistor of the one of the pixel circuits, and first, second, and third NMOS transistors coupled between the clamp voltage and the gate terminal of the row select transistor of the one of the pixel circuits. The PMOS transistors and the NMOS transistors are coupled in parallel. The PMOS transistors are configured to provide an upper clamp voltage range, and the NMOS transistors are configured to provide a lower clamp voltage range.

14 Claims, 5 Drawing Sheets

| | RC Driver On | RC Driver Off |
|---|---|---|
| 646 ~ pcon1 | 0 V | VH |
| 647 ~ ncon1 | Vref | 0 V |
| 648 ~ ncon2 | Vref | VN |
| 649 ~ ncon3 | VH | 0 V |

US 11,843,884 B1

HV DRIVER FOR ROLLING CLAMP IN IMAGE SENSOR

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
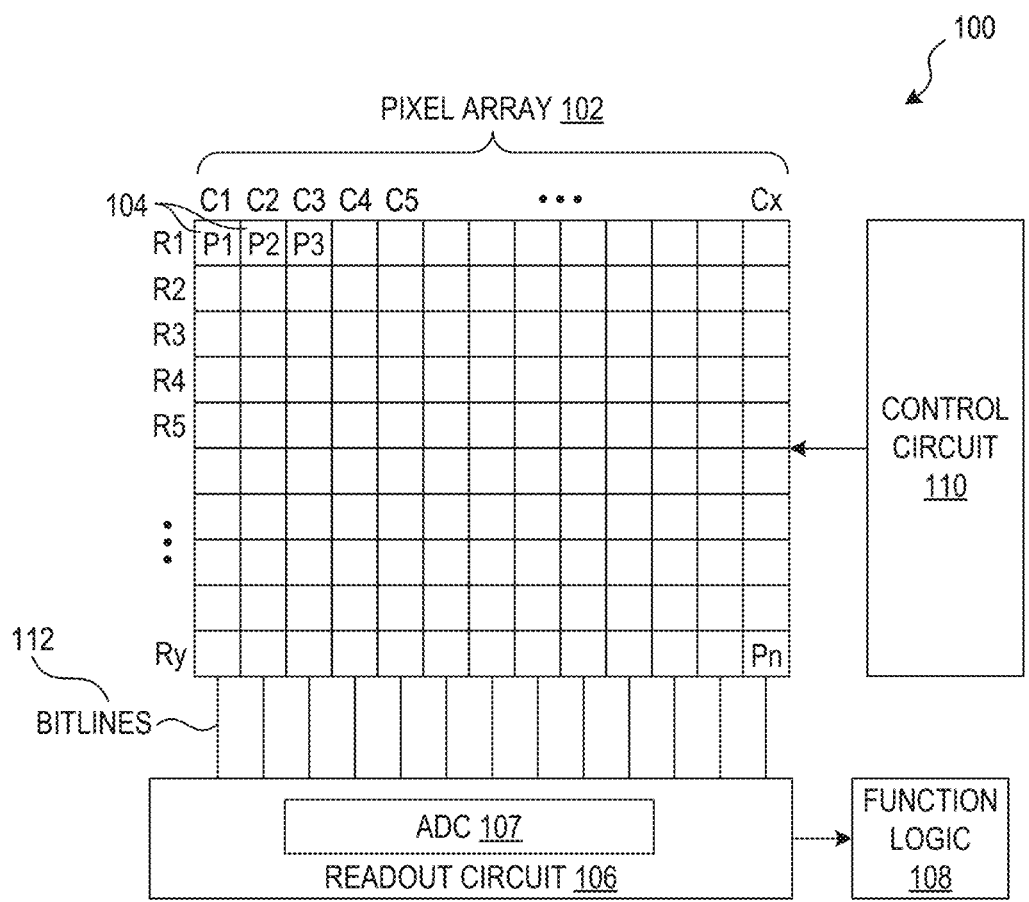
FIG. 1 illustrates one example of an imaging system in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with a rolling clamp driver providing increased clamping voltage range, reduced cost, and reduced risk of transistor breakdown are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with a rolling clamp driver providing increased clamping voltage range, reduced cost, and reduced risk of transistor breakdown are disclosed. Pixel circuits included in an imaging system may receive a voltage from a voltage supply mesh grid at various nodes (i.e., voltage sources). Each voltage source has both horizontal and vertical current drawing paths in the mesh grid. In the same row, the voltage at nodes sensing a dim light may increase due to low current draw through the voltage supply grid from nodes sensing a bright light, as bright light pixels draw only vertical current. This change in the voltage source changes the voltage at the floating diffusion in the same trend, and can result in deleterious h-banding in sensed images, especially when the sensed image has a large amount of contrast between bright and dark regions. H-banding occurs when dark regions of an image appear darker when in the same row as a bright region. Rolling clamping helps to reduce h-banding by mitigating the change in current, and this, changes in the voltage in the voltage supply grid.

Conventional imaging systems with rolling clamp drivers, however, suffer from high risk of transistor breakdown due to the potential difference across different transistor terminals exceeding certain thresholds. Rolling clamp drivers can also malfunction if the clamp voltage exceeds the acceptable voltage range that the rolling clamp drivers can handle. Moreover, imaging systems can have thousands of rolling clamp drivers on a single image sensor logic chip, so the risk of transistor breakdown and malfunction can be very high. Furthermore, using transistors specially manufactured to withstand high voltages can be extremely costly.

It is appreciated that an imaging system in accordance with the teachings of the present disclosure can include a high-voltage rolling clamp driver that can provide a wide clamp voltage range without using expensive, specially manufactured high-voltage transistors. The rolling clamp driver can include transistors arranged in a transmission gate structure with a PMOS side and an NMOS side with different bias schemes. In various examples, the PMOS side is biased with static cascode biasing and the NMOS side is biased with dynamic triple cascode biasing. In various examples, the rolling clamp driver limits the potential difference across different transistor terminals to prevent transistor breakdowns. In various examples, the rolling clamp driver includes normal transistors as opposed to specially manufactured, expensive high-voltage transistors which require high-voltage wells or high-voltage gate oxide. In various examples, the imaging system includes 40 nm normal transistors using 3.3V process technology. In various examples, a PMOS transistor is located in an N-well, and an NMOS transistor is located in a P-well, which is not connected to a substrate, so both NMOS and PMOS bodies can be connected to arbitrary potentials.

Thus, as will be shown and described in the various examples below, an example imaging system includes a pixel array with a plurality of pixel circuits. Each pixel circuit includes a photodiode configured to photogenerate image charge in response to incident light, a floating diffusion coupled to receive the image charge from the photodiode, a source follower transistor with a gate terminal coupled to the floating diffusion, and a row select transistor coupled to a source terminal of the source follower transistor. The example imaging system further includes a plurality of rolling clamp (RC) drivers, where each RC driver is coupled to a gate terminal of a row select transistor of one of the pixel circuits and each RC driver has an on state and an off state. Each RC driver includes a first PMOS transistor coupled between a clamp voltage and the gate terminal of the row select transistor of the one of the pixel circuits, a second PMOS transistor coupled between the first PMOS transistor and the gate terminal of the row select transistor of the one of the pixel circuits, a first NMOS transistor coupled between the clamp voltage and the gate terminal of the row select transistor of the one of the pixel circuits, a second NMOS transistor coupled between the first NMOS transistor and the clamp voltage, and a third NMOS transistor coupled between the second NMOS transistor and the clamp voltage. The first and second PMOS transistors and the first, second, and third NMOS transistors are coupled in parallel between the clamp voltage and the gate terminal of the row select transistor of the one of the pixel circuits. The first and second PMOS transistors of each RC driver are configured to provide an upper clamp voltage range to the gate terminal of the row select transistor of the one of the pixel circuits. The first, second, and third NMOS transistors of each RC driver are configured to provide a lower clamp voltage range to the gate terminal of the row select transistor of the one of the pixel circuits.

To illustrate, FIG. 1 shows one example of an imaging system 100 having a readout circuit 106 in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, the readout circuit 106 may be configured to read out the image signals through the column bitlines 112. As will be discussed, in the various examples, readout circuit 106 may include an analog-to-digital converter (ADC) 107 in accordance with the teachings of the present disclosure. In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital camera, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
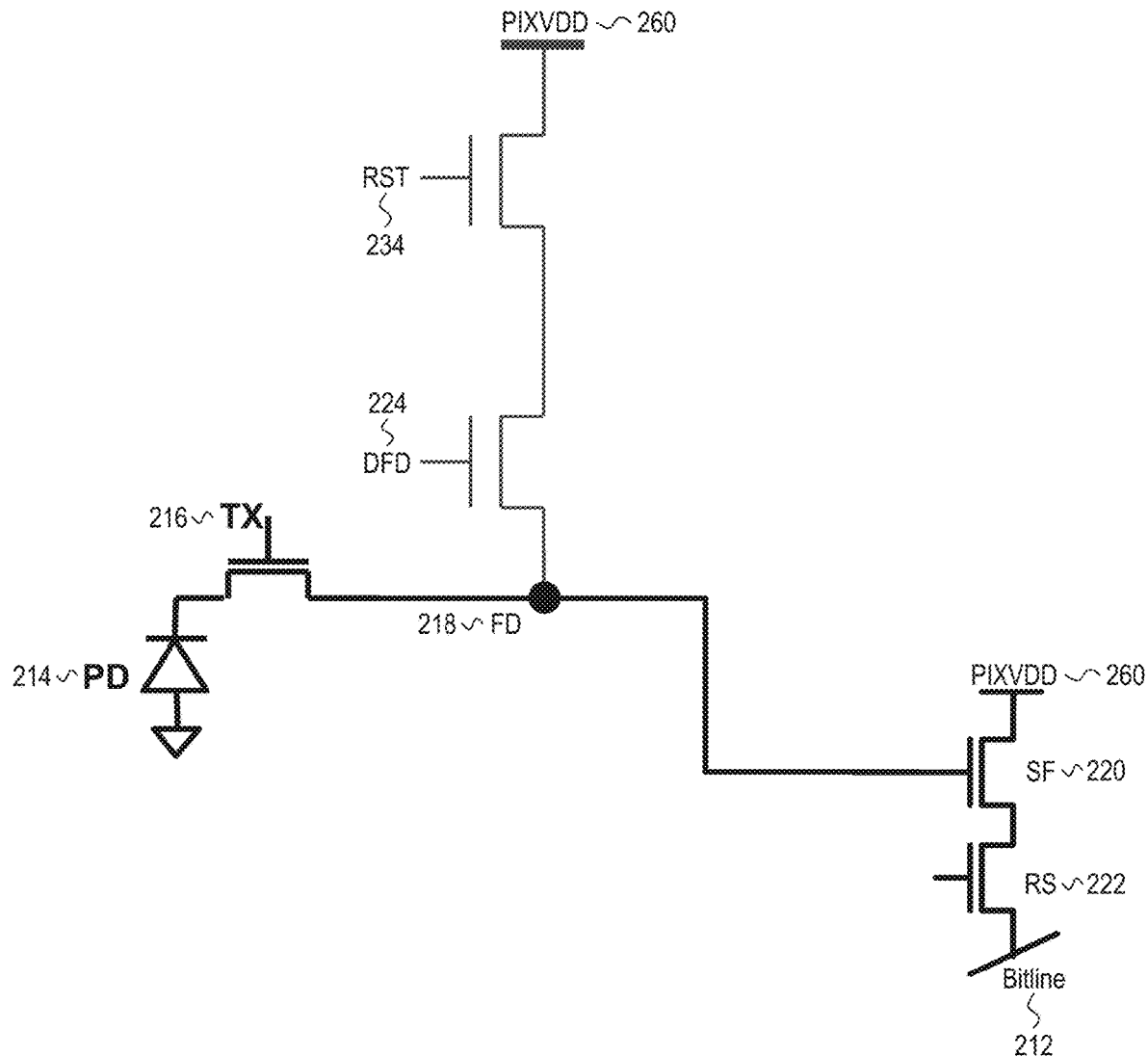
FIG. 2 illustrates a schematic of an example pixel circuit in accordance with the teachings of the present disclosure.

FIG. 2 illustrates a schematic of an example pixel circuit 204 in accordance with the teachings of the present disclosure. It is appreciated that the pixel circuit 204 of FIG. 2 may be an example of one of the pixel circuits 104 included in the imaging system 100 as shown in FIG. 1, and that similarly named and numbered elements described above are coupled and function similarly below.

In the illustrated example, the pixel circuit 204 includes a photodiode 214 configured to photogenerate image charge in response to incident light, a floating diffusion 218 coupled to receive the image charge from the photodiode 214, a transfer transistor 216 coupled between the photodiode 214 and the floating diffusion 218 to transfer the image charge from the photodiode 214 to the floating diffusion 218, a reset transistor 234 coupled between the photodiode 214 and a voltage source PIXVDD 260, and a dual floating diffusion transistor 224 coupled between the reset transistor 234 and the floating diffusion 218. The pixel circuit 204 also includes a source follower transistor 220 with a gate terminal coupled to the floating diffusion 218 and a drain terminal coupled to the voltage source PIXVDD 260, and a row select transistor 222 coupled between a source terminal of the source follower transistor 220 and a bitline 212.

In an imaging system providing rolling clamp, each row of pixel circuits (e.g., rows R1 to Ry illustrated in FIG. 1) can be read out one-by-one while adjacent rows are clamped. Various control signals can be sent to a gate terminal of the row select transistor 222 depending on whether the row in which the pixel circuit is in is being read out, clamped, or neither.

Figure 3:
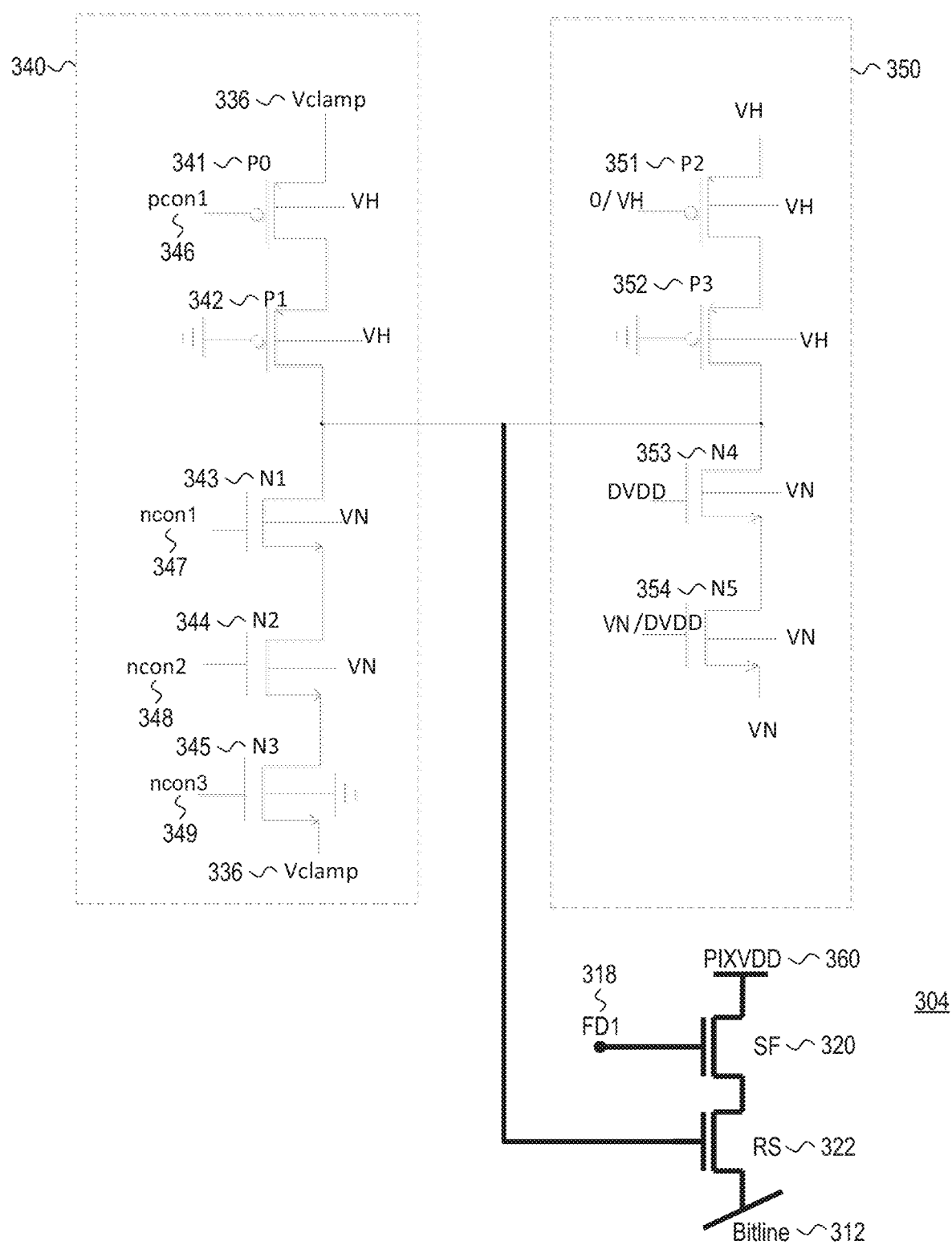
FIG. 3 illustrates a schematic of an example rolling clamp driver and an example row select driver in accordance with the teachings of the present disclosure.

FIG. 3 illustrates a schematic of an example rolling clamp (RC) driver 340 and an example row select (RS) driver 350 in accordance with the teachings of the present disclosure. It is appreciated that the RC driver 340 and the RS driver 350 are coupled to output control signals to pixel circuit 304, and that pixel circuit 304 of FIG. 3 may be an example of one of the pixel circuits 104 included in the imaging system 100 as shown in FIG. 1, and that similarly named and numbered elements described above are coupled and function similarly below.

In the illustrated example, the RC driver 340 includes a first PMOS transistor P0 341 and a second PMOS transistor P1 342 coupled between a clamp voltage Vclamp 336 and the gate terminal of the row select transistor 322 of the pixel circuit 304. The RC driver 340 also includes a first NMOS transistor N1 343, a second NMOS transistor N2 344, and a third NMOS transistor N3 345 coupled between the clamp voltage Vclamp 336 and the gate terminal of the row select transistor 322. In the illustrated example, the first and second PMOS transistors P0 341 and P1 342 and the first, second, and third NMOS transistors N1 343, N2 344, and N3 345 are coupled in parallel between the clamp voltage Vclamp 336 and the gate terminal of the row select transistor 322. In other embodiments, the RC driver 340 can include fewer or more transistors arranged in different configurations.

The first PMOS transistor P0 341 can have a gate terminal coupled to a variable signal pcon1 346 and a body terminal coupled to a high voltage VH. The second PMOS transistor P1 342 can have a gate terminal coupled to ground and a body terminal coupled to the high voltage VH. The first NMOS transistor N1 343 can have a gate terminal coupled to a variable signal ncon1 347 and a body terminal coupled to a negative voltage VN. The second NMOS transistor N2 344 can have a gate terminal coupled to a variable signal ncon2 348 and a body terminal coupled to the negative voltage VN. The third NMOS transistor N3 345 can have a gate terminal coupled to a variable signal ncon3 349 and a body terminal coupled to ground. The signals coupled to the various gate terminals can be controlled to configure the RC driver 340 to output the clamp voltage Vclamp 336 or turn off.

In the illustrated example, the RS driver 350 includes a third PMOS transistor P2 351 and a fourth PMOS transistor P3 352 coupled between the high voltage VH and the gate of the row select transistor 322. The RS driver 350 also includes a fourth NMOS transistor N4 353 and a fifth NMOS transistor N5 354 coupled between the negative voltage VN and the gate of the row select transistor 322. In other embodiments, the RS driver 350 can include fewer or more transistors arranged in different configurations.

The third PMOS transistor P2 351 can have a gate terminal coupled to either 0 V or the high voltage VH, and a body terminal coupled to the high voltage VH. The fourth PMOS transistor P3 352 can have a gate terminal coupled to ground and a body terminal coupled to the high voltage VH. The fourth NMOS transistor N4 353 can have a gate terminal coupled to a fixed voltage DVDD and a body terminal coupled to the negative voltage VN. The fifth NMOS transistor N5 354 can have a gate terminal coupled to either the negative voltage VN or the fixed voltage DVDD, and a body terminal coupled to the negative voltage VN. The signals coupled to the various gate terminals can be controlled to configure the RS driver 350 to output either the high voltage VH or the negative voltage VN, or turn off. The fixed voltage DVDD can be a voltage supply used for a digital circuit, and is normally at 1.2V, which is less than the voltage source PIXVDD 260.

Referring back to the RC driver 340, the second PMOS transistor P1 342 can be biased with static cascode biasing such that the gate terminal is coupled to ground whether the RC driver 340 is in an on state or an off state. On the other hand, the first, second, and third NMOS transistors N1 343, N2 344, N3 345 can be biased with dynamic triple cascode biasing such that the signals ncon1 347, ncon2 348, and ncon3 349 can vary depending on whether the RC driver 340 is in the on state or the off state. By applying static cascode biasing to the PMOS side of the RC driver 340 and dynamic triple cascode biasing to the NMOS side of the RC driver 340, the potential differences across the transistor terminals can be kept below a breakdown voltage difference (e.g., 3.6 V when using 40 nm transistors with 3.3V process technology). More specifically, the RC driver 340 can keep the potential differences across the gate-source, the gate-drain, the gate-body, and the drain-source terminals below the breakdown threshold. The potential differences across the drain-body and the source-body terminals are inherently subject to less breakdown risk due to the transistors' P-N junctions. Moreover, the RC driver 340 can sufficiently reduce the risk of breakdown or malfunction without including specially manufactured high-voltage transistors, which can be costly.

Furthermore, by virtue of the transmission gate structure, the RC driver 340 can handle a wide range of clamp voltage values and pass signals without significant voltage drops (i.e., with very low resistance). The first and second PMOS transistors P0 341, P1 342 can pass relatively high clamp voltages Vclamp 336, and the first, second, and third NMOS transistors N1 343, N2 344, N3 345 can pass relatively low clamp voltages Vclamp 336. In various examples, the clamp voltage Vclamp 336 can range between 0.6 V and 3 V.

Figure 4:
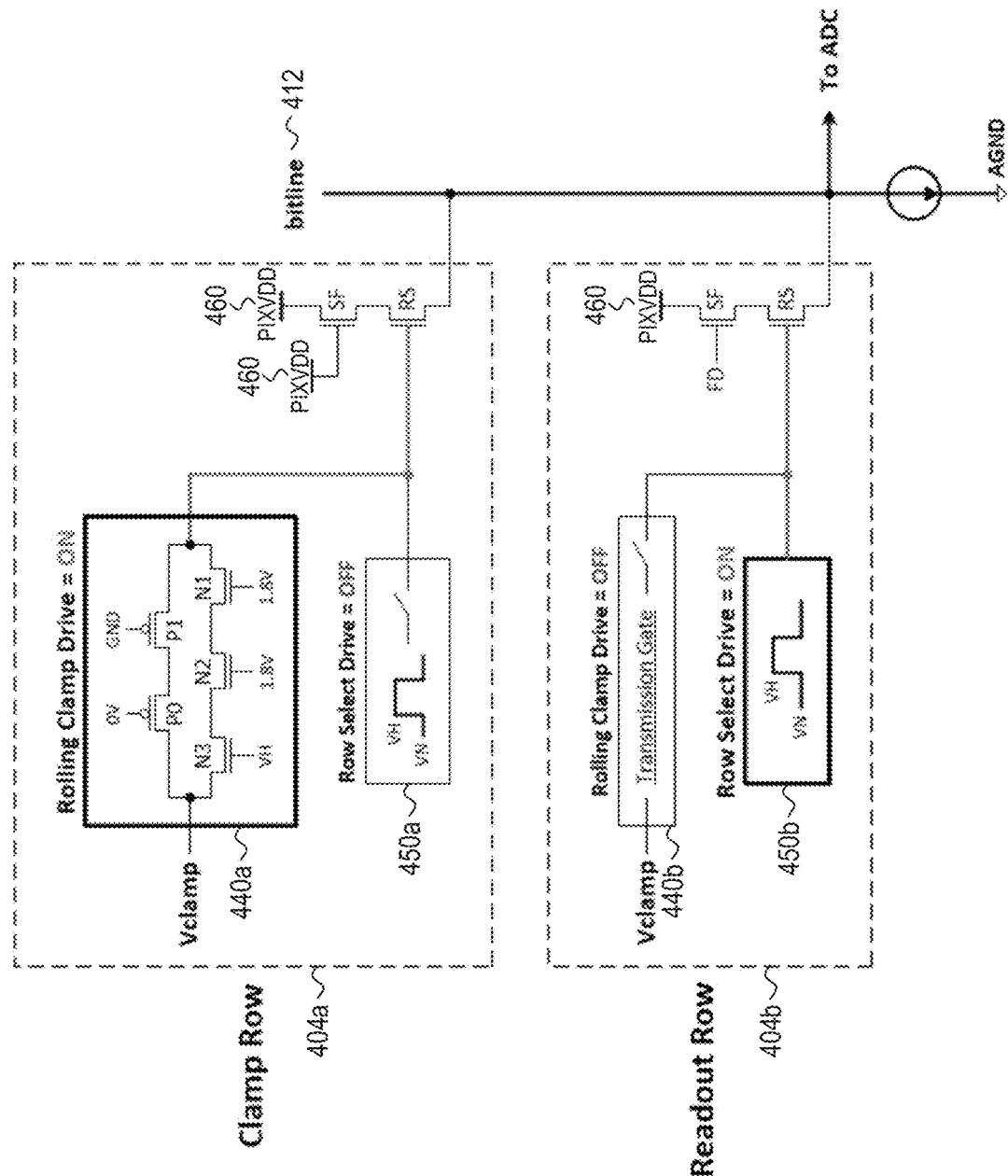
FIG. 4 illustrates a schematic of example rolling clamp drivers and row select drivers in a clamp row and a readout row in accordance with the teachings of the present disclosure.

FIG. 4 illustrates a schematic of example RC drivers 440 and RS drivers 450 in a clamp row 404a and a readout row 404b in accordance with the teachings of the present disclosure. It is appreciated that the RC drivers 440 and the RS drivers 450 of FIG. 4 may be examples of the RC driver 340 and the RS driver 350 as shown in FIG. 3, and that similarly named and numbered elements described above are coupled and function similarly below.

In an imaging system providing rolling clamp, a high voltage signal (i.e., on signal) is sent to the gate terminal of the row select transistors in the readout row (e.g., 404b), a clamping voltage signal is sent to the gate terminal of the row select transistors in an adjacent row(s) that is utilized as a clamp row (e.g., 404a), and a low voltage signal (i.e., off signal) is sent to the gate terminal of the row select transistors in remaining rows. In the illustrated example, a pixel circuit in a readout row 404b includes a RC driver 440b configured to be off and a RS driver 450b configured to be on, and send a high voltage signal VH to the gate terminal of the corresponding row select transistor. The gate of the source follower transistor SF is coupled to the floating diffusion FD, where signals from a photodiode can be stored. On the other hand, a pixel circuit in a clamp row 404a includes a RC driver 440a configured to be on and send a clamping voltage signal to the gate terminal of the corresponding row select transistor. The gate of the source follower transistor SF is coupled to the voltage source PIXVDD 460 and RST and DFD transistors (e.g., the RST 234 and DFD 224 transistors illustrated in FIG. 2) are both configured to be on. The row select transistors in the clamp row 404a and the readout row 404b are configured to be coupled to the same bitline 412 such that the clamp row 404a can clamp the readout row 404b.

Figures 5, 6:
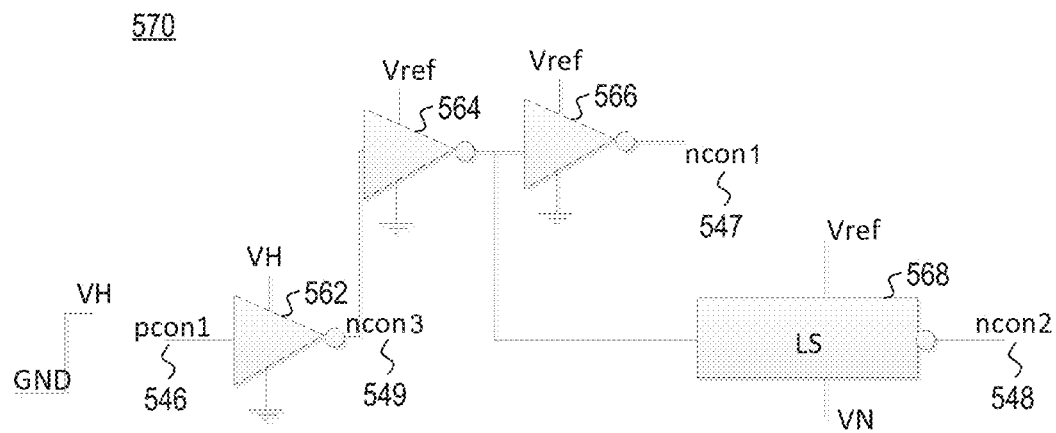
FIG. 5 illustrates a schematic of an example circuit for controlling gate voltage values for transistors in a rolling clamp driver in accordance with the teachings of the present disclosure.
FIG. 6 is a table listing example gate voltage values for transistors in a rolling clamp drive in accordance with the teachings of the present disclosure.

FIG. 5 illustrates a schematic of an example circuit 570 for controlling or providing the gate voltage values for transistors in a rolling clamp driver in accordance with the teachings of the present disclosure. It is appreciated that the circuit 570 of FIG. 5 may be coupled to control gate voltage values for the transistors included in the RC driver 340 shown in FIG. 3, and that similarly named and numbered elements described above are coupled and function similarly below.

In the illustrated example, the circuit 570 includes a first inverter 562 including an input coupled to a gate terminal of a first PMOS transistor pcon1 546 (e.g., gate terminal pcon1 346 of the first PMOS transistor 341), supply inputs coupled to the high voltage VH and ground, and an inverted output coupled to a gate terminal of a third NMOS transistor ncon3 549 (e.g., gate terminal ncon3 349 of the third NMOS transistor 345). A second inverter 564 includes an input coupled to ncon3 549, supply inputs coupled to a reference voltage Vref and ground, and an inverted output. A level shifter 568 includes an input coupled to the inverted output of the second inverter 564, supply inputs coupled to the reference voltage Vref and the negative voltage VN, and an inverted output coupled to a gate terminal of a second NMOS transistor ncon2 548 (e.g., gate terminal ncon2 348 of the second NMOS transistor 344). A third inverter 566 includes an input coupled to the inverted output of the second inverter 564, supply inputs coupled to the reference voltage Vref and ground, and an inverted output coupled to a gate terminal of a first NMOS transistor ncon1 547 (e.g., gate terminal ncon1 347 of the first NMOS transistor 343). In various examples, VH is a high voltage value (e.g., 3.6 V) and VN is a negative voltage value (e.g., −1.4 V). In various examples, Vref is a reference voltage value that is between 0 V and the high voltage VH (e.g., 1.8 V).

The signal pcon1 546, which can be coupled to the gate terminal of a first PMOS transistor of a RC driver (e.g., the first PMOS transistor P0 341 illustrated in FIG. 3), can be toggled between a high value (e.g., VH) and a low value (e.g., 0 V) to control the values of the other signals ncon1 547, ncon2 548, and ncon3 549, which can be coupled to the gate terminals of NMOS transistors of a RC driver (e.g., the first, second, and third NMOS transistors N1 343, N2 344, N3 345, respectively). Changing the values of the signals ncon1 547, ncon2 548, and ncon3 549 can provide dynamic triple cascode biasing to NMOS transistors in a RC driver. In various examples, the dynamic triple cascode biasing is provided by a plurality of on-chip level shifters.

FIG. 6 is a table listing example gate voltage values for transistors in a rolling clamp drive in accordance with the teachings of the present disclosure. It is appreciated that the values shown in FIG. 6 can be example gate voltage values for the transistors included in the RC driver 340 as shown in FIG. 3, and that similarly named and numbered elements described above are coupled and function similarly below.

When the RC driver is on, the signal pcon1 646, which can be applied to a first PMOS transistor (e.g., the first PMOS transistor P0 341), can be 0 V, and the signals ncon1 647, ncon2 648, and ncon3 649, which can be coupled to the gate terminals of NMOS transistors (e.g., the first, second, and third NMOS transistors N1 343, N2 344, N3 345), can be Vref, Vref, and VH, respectively. When the RC driver is off, the signal pcon1 646 can be VH, and the signals ncon1 647, ncon2 648, and ncon3 649 can be 0 V, VN, and 0V, respectively. In various examples, VH is a high voltage value (e.g., 3.6 V) and VN is a negative voltage value (e.g., −1.4 V). In various examples, Vref is a reference voltage value that is between 0 V and the high voltage VH (e.g., 1.8 V). Vref can be tunable to cope with various technologies. For example, when Vref is applied to the gate terminals of the first NMOS transistor N1, the N1 gate-to-source, gate-to-drain, and gate-to-body voltages are controlled to be within a certain breakdown voltage determined by certain process technologies.

By applying static cascode biasing to the PMOS side of the RC driver and dynamic triple cascode biasing to the NMOS side of the RC driver, the potential differences across the transistor terminals can be kept below a breakdown voltage difference (e.g., 3.6 V). More specifically, the RC driver can keep the potential differences across the gate-source, the gate-drain, the gate-body, and the drain-source terminals below the breakdown threshold. The potential differences across the drain-body and the source-body terminals are inherently subject to less breakdown risk due to the transistors' P-N junctions. Moreover, the RC driver can sufficiently reduce the risk of breakdown or malfunction without including specially manufactured high-voltage transistors, which can be costly.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. An imaging system, comprising:
    a pixel array including a plurality of pixel circuits, wherein each pixel circuit includes:
        a photodiode configured to photogenerate image charge in response to incident light;
        a floating diffusion coupled to receive the image charge from the photodiode;
        a source follower transistor with a gate terminal coupled to the floating diffusion; and
        a row select transistor coupled to a source terminal of the source follower transistor; and
    a plurality of rolling clamp (RC) drivers, wherein each RC driver is coupled to a gate terminal of a row select transistor of one of the pixel circuits, wherein each RC driver has an on state and an off state, and wherein each RC driver comprises:
        a first PMOS transistor coupled between a clamp voltage and the gate terminal of the row select transistor of the one of the pixel circuits;
        a second PMOS transistor coupled between the first PMOS transistor and the gate terminal of the row select transistor of the one of the pixel circuits;
        a first NMOS transistor coupled between the clamp voltage and the gate terminal of the row select transistor of the one of the pixel circuits;
        a second NMOS transistor coupled between the first NMOS transistor and the clamp voltage; and
        a third NMOS transistor coupled between the second NMOS transistor and the clamp voltage, wherein the first and second PMOS transistors and the first, second, and third NMOS transistors are coupled in parallel between the clamp voltage and the gate terminal of the row select transistor of the one of the pixel circuits,
    wherein the first and second PMOS transistors of each RC driver are configured to provide an upper clamp voltage range to the gate terminal of the row select transistor of the one of the pixel circuits, and
    wherein the first, second, and third NMOS transistors of each RC driver are configured to provide a lower clamp voltage range to the gate terminal of the row select transistor of the one of the pixel circuits.

2. The imaging system of claim 1, wherein the second PMOS transistor of each RC driver is configured to be biased with static cascode biasing.

3. The imaging system of claim 2, wherein for each RC driver, when the RC driver is in the on state:
    a gate terminal of the first PMOS transistor is configured to be coupled to a zero voltage value, and
    a gate terminal of the second PMOS transistor is configured to be coupled to ground.

4. The imaging system of claim 2, wherein for each RC driver, when the RC driver is in the off state:
    a gate terminal of the first PMOS transistor is configured to be coupled to a high voltage value, and
    a gate terminal of the second PMOS transistor is configured to be coupled to ground.

5. The imaging system of claim 1, wherein the first, second, and third NMOS transistors are configured to be biased with dynamic triple cascode biasing.

6. The imaging system of claim 5, wherein for each RC driver, when the RC driver is in the on state:
    a gate terminal of the first NMOS transistor is configured to be coupled to a reference voltage value,
    a gate terminal of the second NMOS transistor is configured to be coupled to the reference voltage value, and
    a gate terminal of the third NMOS transistor is configured to be coupled to a high voltage value,
    wherein the high voltage value is higher than the reference voltage value.

7. The imaging system of claim 5, wherein for each RC driver, when the RC driver is in the off state:
    a gate terminal of the first NMOS transistor is configured to be coupled to a zero voltage value,
    a gate terminal of the second NMOS transistor is configured to be coupled to a negative voltage value, and
    a gate terminal of the third NMOS transistor is configured to be coupled to the zero voltage value,
    wherein the negative voltage value is lower than the zero voltage value.

8. The imaging system of claim 4, wherein the dynamic triple cascode biasing is provided by a plurality of on-chip level shifters.

9. The imaging system of claim 1, wherein each of the first and second PMOS transistors and the first, second, and third NMOS transistors is a non-high voltage specialized transistor.

10. The imaging system of claim 1, further comprising a plurality of row select (RS) drivers, wherein each RS driver is coupled to a gate terminal of a row select transistor of another one of the pixel circuits, wherein each RS driver has an on state and an off state, wherein one of the RS drivers is configured to be in the off state when a corresponding RC driver is in the on state, and wherein the one of the RS drivers is configured to be in the on state when the corresponding RC driver is in the off state.

11. The imaging system of claim 1, wherein for each of the first and second PMOS transistors and the first, second, and third NMOS transistors, a gate-body voltage difference, a gate-drain voltage difference, a gate-source voltage difference, and a drain-source voltage difference are configured to be less than a breakdown voltage value.

12. The imaging system of claim 1, further comprising:
    a first inverter including an input coupled to a gate terminal of the first PMOS transistor, a supply input coupled to a high voltage value, and an inverted output coupled to a gate terminal of the third NMOS transistor;
    a second inverter including an input coupled to the inverted output of the first inverter, a supply input coupled to a reference voltage value, and an inverted output;
    a level shifter including an input coupled to the inverted output of the second inverter, supply inputs coupled to the reference voltage value and a negative voltage value, and an inverted output coupled to a gate terminal of the second NMOS transistor; and
    a third inverter including an input coupled to the inverted output of the second inverter, a supply input coupled to the reference voltage value, and an inverted output coupled to a gate terminal of the first NMOS transistor.

13. The imaging system of claim 1, wherein the upper clamp voltage range includes 3V, and wherein the lower clamp voltage range includes 0.6 V.

14. The imaging system of claim 6, wherein the reference voltage is configured to maintain each of a gate-to-source voltage, a gate-to-drain voltage, and a gate-to-body voltage of at least one of the first and second NMOS transistors to be within a breakdown voltage, and wherein the breakdown voltage is determined by process technology used to manufacture the at least one of the first and second NMOS transistors.

* * * * *